United States Patent
Fredlund et al.

(10) Patent No.: US 7,167,272 B2
(45) Date of Patent: Jan. 23, 2007

(54) METHOD AND SYSTEM FOR A PHOTO SELECTION SERVICE

(75) Inventors: John R. Fredlund, Rochester, NY (US); Yat Fan Chiu, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 883 days.

(21) Appl. No.: 10/116,998

(22) Filed: Apr. 5, 2002

(65) Prior Publication Data

US 2003/0189721 A1 Oct. 9, 2003

(51) Int. Cl.
  *G06K 15/00* (2006.01)
  *H04N 1/46* (2006.01)
(52) U.S. Cl. .................. 358/1.2; 358/1.12; 358/527
(58) Field of Classification Search .............. 358/1.2, 358/1.12, 1.16, 506, 504, 527, 530
  See application file for complete search history.

(56) References Cited

U.S. PATENT DOCUMENTS

| | | | |
|---|---|---|---|
| 5,113,351 A | 5/1992 | Bostic | |
| 5,218,455 A | 6/1993 | Kristy | |
| 5,666,215 A * | 9/1997 | Fredlund et al. ............ | 358/487 |
| RE36,535 E | 1/2000 | Hicks | |
| 6,017,157 A | 1/2000 | Garfinkle et al. | |
| 6,133,985 A | 10/2000 | Garfinkle et al. | |
| 6,154,295 A | 11/2000 | Fredlund et al. | |
| 6,243,171 B1 * | 6/2001 | Haneda ...................... | 358/1.15 |
| 6,388,732 B1 * | 5/2002 | Williams et al. ............. | 355/40 |
| 2002/0015179 A1 * | 2/2002 | Igarashi et al. ............ | 358/1.15 |
| 2002/0065741 A1 * | 5/2002 | Baum ......................... | 705/26 |
| 2002/0067500 A1 * | 6/2002 | Yokomizo et al. ......... | 358/1.15 |
| 2004/0207873 A1 * | 10/2004 | Kinjo ......................... | 358/1.15 |
| 2005/0047684 A1 * | 3/2005 | Baum et al. ................ | 382/311 |
| 2005/0091119 A1 * | 4/2005 | Tuijn et al. .................. | 705/26 |

FOREIGN PATENT DOCUMENTS

EP 1139256 A1 4/2001
JP 2004-334523 * 11/2005

OTHER PUBLICATIONS

U.S. Appl. No. 10/061,385, Fredlund et al.
Keith Jack, "Video Demystified," 1996, pp. 132-133.

* cited by examiner

*Primary Examiner*—Jerome Grant
(74) *Attorney, Agent, or Firm*—Stephen H. Shaw

(57) ABSTRACT

A method for facilitating orders for image services, including the steps of: storing at least one high resolution digital image file and an associated identifier on a photofinisher's image storage device; storing the at least one high resolution digital image file and the associated identifier to a memory device; delivering the memory device to the user; selecting the at least one high resolution digital image file for display and at least one image service with user selection creating at least one image service order using the user selection software; the photofinisher receiving the at least one image service order from the user over a communication network; and fulfilling the at least one image service order using the at least one stored high resolution digital image file in the photofinisher's image storage device to fulfill the at least one image service order.

27 Claims, 2 Drawing Sheets

METHOD AND SYSTEM FOR A PHOTO SELECTION SERVICE

FIELD OF THE INVENTION

The invention relates generally to the field of photography and photofinishing, and in particular to selection and specification of desired images and modifications to be delivered by a service provider.

BACKGROUND OF THE INVENTION

Consumers have shown a strong desire for selecting personal images for printing. Consumers desire to print only images that they find good or valuable. One method of providing consumers with this capability is to post personal images on the internet. The photofinisher will process and scan film provided by the consumer and then post the scans at some resolution high enough to enable selecting desired photos. This allows the consumer to select images via his home computer or an interactive kiosk. However, consumers also exhibit an aversion to posting personal images on the web, even with the use of passwords and other methods of keeping the images secure, and thus are reluctant to use these internet services. Additionally, consumers prefer to receive a tangible manifestation of their images, and the images posted on the web appear all too ethereal for many consumers.

Those consumers that use digital cameras also face a problem when attempting to get high quality prints. If their local home printer is not adequate for printing the quality of prints the consumer desires, or is difficult to use, the consumer has to upload images to a service provider for printing. In this case, the consumer is forced to upload images of adequate resolution for high quality printing. This is typically a problem for consumers with low bandwidth connections. It is also a process that is fraught with difficulties associated with transferring large amounts of data. Last, digital camera users are also often uneasy with sending their image files into the "ether" as represented by the internet.

One solution to the aforementioned was described in U.S. Pat. No. Re. 36,535, entitled, "METHOD OF PRODUCING PHOTOGRAPHIC PRINTS," issued on Jan. 25, 2000 to Hicks. Hicks disclosed two workstations, i.e., computers, one at the photo lab, the second computer at the photographer's studio. At the second computer a consumer is able to view a video image of her captured film frames, stored on a diskette, along with proof prints. An initial set of corrections are made to the film frames at the photo lab, before sending the film images and proof prints to the consumer.

FIG. 1 illustrates Hicks system. A photo lab 12 receives exposed film of subject 14, taken with camera 16. At the photo lab 12, a developer 18, an editor 20, and an analyzer 22 process the exposed film and perform the initial corrections on the film. The initial corrections are stored in a database 28 and on a diskette 30. Each frame of the film is also marked. One can display the image of each frame upon a monitor 22a, and adjust color and density during the initial corrections.

The edited and analyzed film is transferred to a proof printer 24. The proof printer 24 also uses information from the database 28 and the diskette 30 to produce proof prints that correspond to each frame of the film. A final printer 26 makes the final print upon acceptance by the consumer of the proof prints.

Before giving their acceptance, the consumer views the video image stored on the diskette 30 on a studio computer monitor 32a, upon placing the diskette 30 in studio computer 32. A video image display information box 34a will indicate such initial corrections as cropping, and also batch number and frame number of the film. A printer 34 allows printing of images from the diskette 30. The images are displayed on the studio computer monitor 32a at the photographic studio 10. At this juncture the printed images from the photographic studio 10 merely serve as a receipt to show the characteristics of the prints that have been ordered. The diskette 30 has to be returned to the photo lab 12 in order to process a final high resolution print.

The Hicks system requires that proof prints be sent along with the video image file on the diskette 30 to enable a consumer to view example high resolution proofs. Thus, the modified or corrected video image file does not contain high resolution images. In addition, extensive film management is needed in the Hicks system in order to provide a final print output. Also, the video image file is not stored at the photofinisher's, but instead has to be conveyed from the consumer to the photofinisher via a modem or other means.

What is needed is a consumer-oriented photo selection system for correcting high resolution images and sending those corrections to a photofinisher without actually sending data-intensive image files.

SUMMARY OF THE INVENTION

The present invention is directed to overcoming one or more of the problems by providing a method for facilitating orders for image services that includes the steps of: a) providing exposed film of a user to a photofinisher; b) developing the exposed film so as to develop at least one latent image on the film; c) scanning the developed film so as to obtain at least one high resolution digital image file of the at least one latent image on the exposed film; d) associating an identifier for the at least one high resolution digital image file and storing the at least one high resolution digital image file and the associated identifier on a photofinisher's image storage device; e) storing the at least one high resolution digital image file and the associated identifier to a memory device; f) delivering the memory device to the user; g) selecting the at least one high resolution digital image file for display and at least one image service with user selection software; h) creating at least one image service order using the user selection software; i) the photofinisher receiving the at least one image service order from the user over a communication network; and j) fulfilling the at least one image service order using the at least one stored high resolution digital image file in the photofinisher's image storage device to fulfill the at least one image service order.

Another embodiment of the present invention is a memory device that includes: captured image files that are substantially the same resolution as corresponding image files stored at a remote photofinisher; and selection software that allows a user to create an image bearing service order from the corresponding image files at the remote photofinisher, wherein the remote photofinisher is automatically connected to the memory device via a communication network that accesses the memory device.

Another embodiment of the present invention is a photo selection system for fulfilling an image service order that includes: a photofinishing high resolution image storage device that receives and transmits high resolution digital image files; a means for obtaining the high resolution digital image files; a memory device writer that stores, on a memory device, the high resolution digital image files for a consumer's subsequent use; and a telecommunications server that receives an image service order sans any imaging file from the consumer and transmits the image service order to a print server, wherein the print server requests a transfer of the high resolution digital image files from the high resolution image storage device.

One other embodiment of the present invention is a method for facilitating orders for image services that includes the steps of: a) providing exposed film of a user to a photofinisher; b) developing the exposed film so as to develop at least one latent image on the exposed film; c) scanning the developed film so as to obtain at least one high resolution digital image file of the at least one latent image on the exposed film; d) associating an identifier for the at least one high resolution digital image file and storing the at least one high resolution digital image file and the associated identifier on a photofinisher's image storage device; e) storing the at least one high resolution digital image file and the associated identifier to a memory device; f) delivering the memory device to the user; g) selecting at least one image service and at least one high resolution digital image file for display by zooming and cropping the at least one high resolution digital image file with user selection software; h) creating an image service order using the user selection software; i) the photofinisher receiving the image service order from the user over a communication network; and j) fulfilling the image service order using the at least one stored high resolution digital image file in the photofinisher's image storage device to fulfill the image service order.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

A user exposes film in a camera to capture images. The user may expose the film in a one-time-use-camera (OTUC). Upon completing the roll of film, it is forwarded to a photofinisher via a retail location or a mailer. The photofinisher processes and scans the film. The film is scanned at high resolution so that the resolution is adequate for creating pleasing final prints. This resolution is always significantly higher than National Television System Committee (NTSC) video resolution (which is typically approximately 720 pixels×485 pixels of active resolution and 858 pixels×525 pixels of total resolution). The image files of the present invention are compressed and written to a memory device such as a CD, typically at a resolution of 1500 pixels×1000 pixels. The CD is returned to the user, via a retail location or a mailer.

Figure 1:
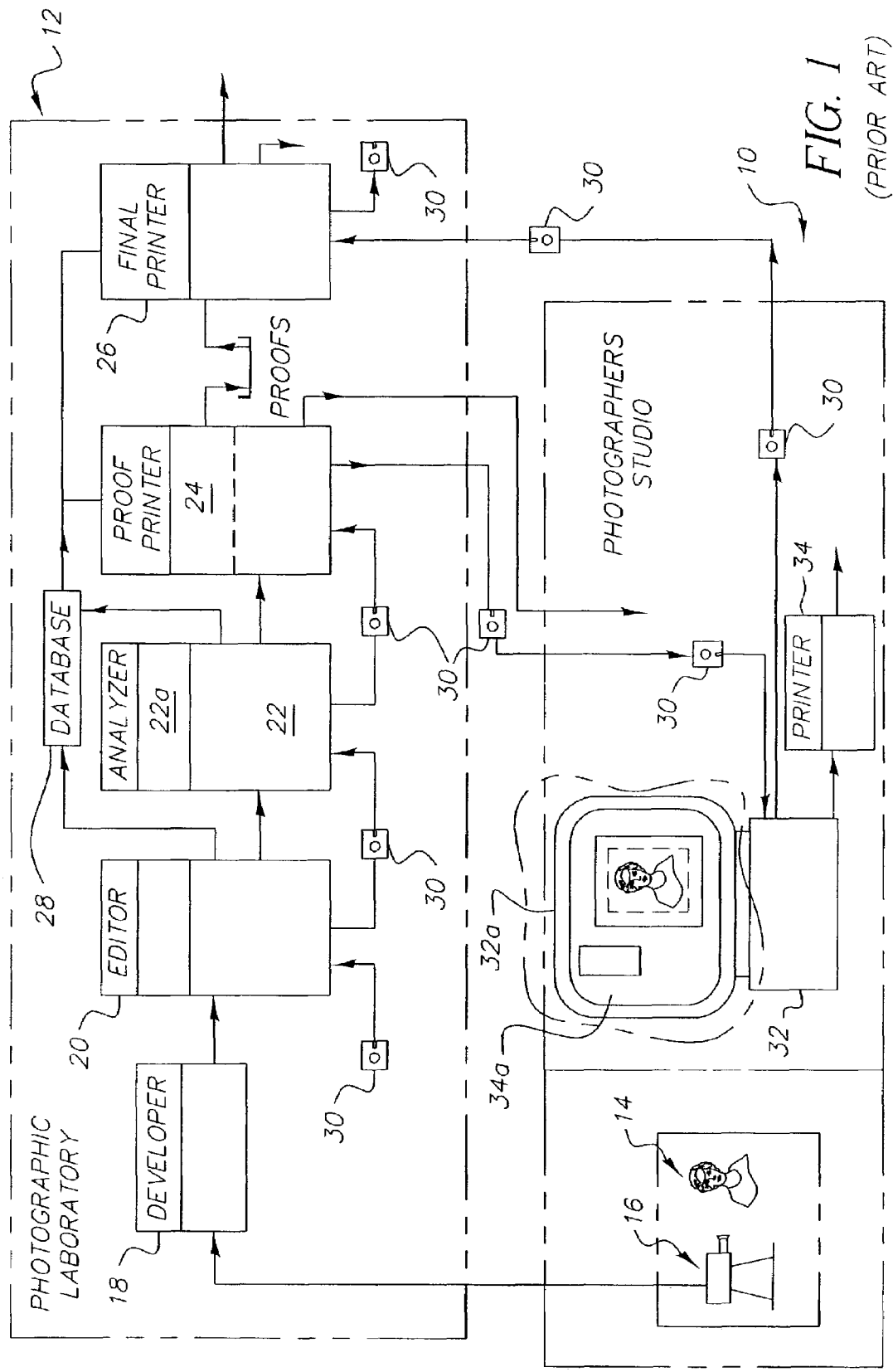
FIG. 1 is a prior art flow diagram that illustrates a photographic process between a photographer's studio and a photographic laboratory.
Figure 2:
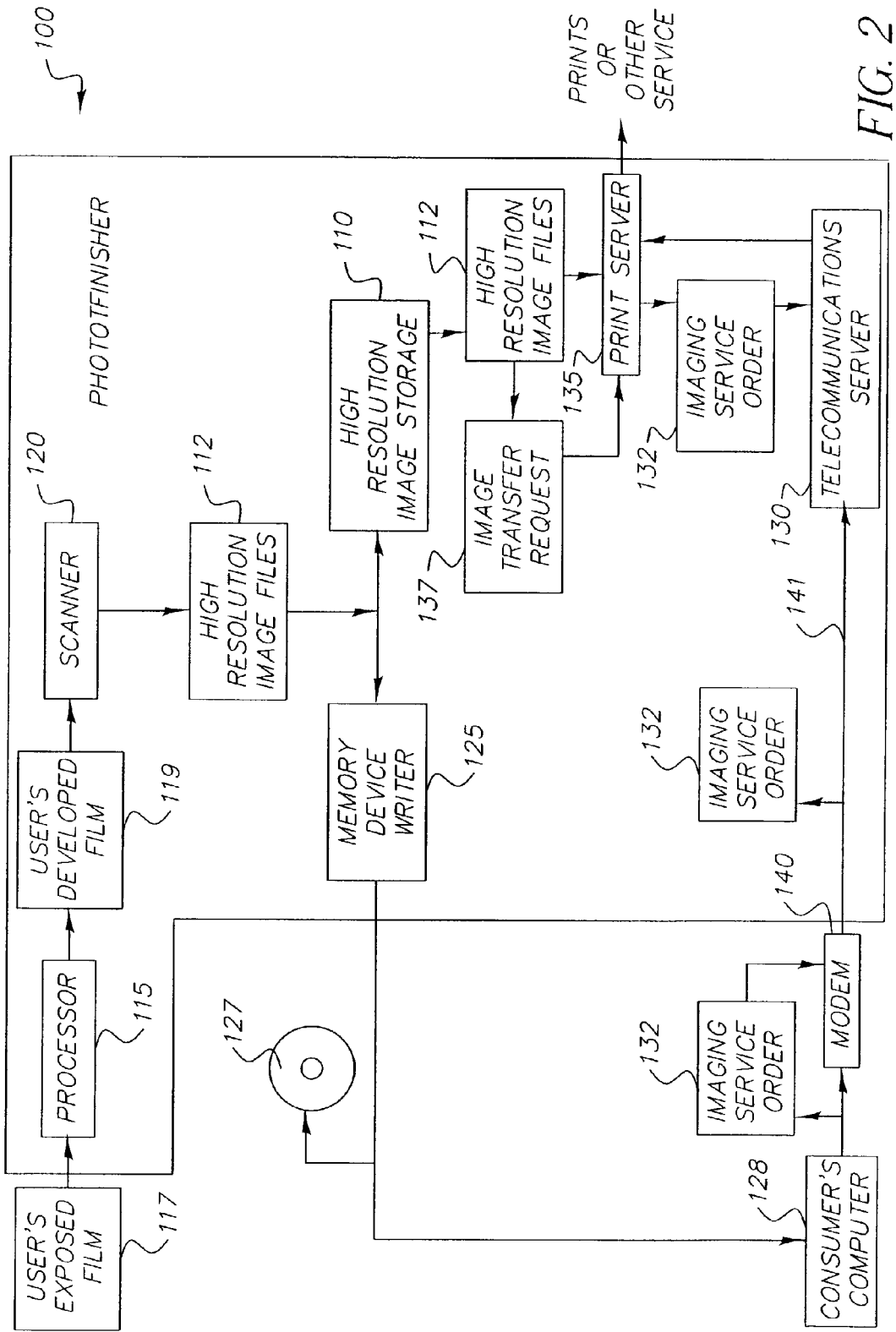
FIG. 2 is an illustration of the present invention that shows the necessary and unnecessary flow of high resolution image files.

Presently, for business reasons, the user must order prints at the same time the CD is ordered. The present invention changes this process. A system 100 for photo selection services is illustrated in FIG. 2. The photo selection services system 100 for fulfilling an image service order 132 includes: a photofinishing high resolution image storage device 110 that receives and transmits high resolution image files 112; a film processor 115 to develop exposed film images 117; a film scanner 120 to scan the developed film images 119 so as to obtain the high resolution digital image files 112 (alternatively, the high resolution digital image files may be uploaded to a remote storage device owned by a third party or the photofinisher); a memory device writer 125 that stores, on a memory device 127 (alternatively, the memory device may include, without limitation, a compact disk (CD), a zip-disk, a digital video disk (DVD), a memory card, a Smart card, a memory stick, or a device having magnetic storage capacity, such as a tape), the high resolution digital image files 112 for a consumer's subsequent use; and a telecommunications server 130 that receives an image service order 132 sans any image file from the consumer and transmits the image service order 132 to a print server 135, wherein the print server 135 requests an image transfer request 137 of the high resolution digital image files 112 from the high resolution image storage device 110.

The photo selection services system 100 also enables the telecommunications server 130 to receive the image service order 132 from a data transmission device 140, such as a modem of 9600 baud rate and greater, or a wireless device, or a satellite device. All such data transmission devices are well known in the art.

The memory device 127 is defined as an apparatus capable of storing high resolution images and, alternatively, selection software that allows a user to request or order imaging services from a photofinisher. The memory device 127 need not be limited to any particular shape, size, format, or capacity. The memory device 127 must have adequate capacity to store high resolution digital images. The memory device 127 with the high resolution digital image files 112 is given to the consumer for remote use. The memory device 127 may be mailed or given to the consumer at a retail store. In addition, selection software on the memory device 127 may be downloaded by the consumer and burned on the consumer's own CD or DVD. The memory device 127 is placed in the consumer's computer 128.

Selection software on the memory device 127 includes a valid order period for creating the image service order 132. The valid order period is determined by the photofinisher, but is capable of being viewed by the consumer to encourage prompt usage of the selection software and imaging services. The selection software also includes an address of the photofinisher that has duplicate copies of the high resolution image files 112. The address may be an email address, IP address, a postal address, or a toll-free phone number. Should a consumer procrastinate and allow the valid order period to lapse before ordering the imaging services, the selection software will change its functionality and metamorphose for another imaging related purpose.

Finally, the selection software includes image identifiers for accessing stored high resolution images and order enticements for various imaging services. The imaging services may include imaging editing, imaging transfer, and placing images on T-shirts, cups, mouse-pads, and within picture frames.

In one embodiment, the photofinisher stores, in an image storage device 110, the same or corresponding high resolution digital image files 112 that are written to a CD 127. Alternatively, in another embodiment, image files of similar image content but differing resolution may be stored. An identifier such as an ID number or the file name is also stored. These identifiers enable rapid identification of high resolution digital image files 112 on the CD 127 with corresponding high resolution digital image files 112 stored at the photofinisher. Passwords may also be written to the disk and also stored to insure security of the user's image files.

When the user receives the CD 127, he is able to view the corresponding high resolution digital image files 112 via user selection software on the CD 127. This user selection software is currently resident on the Kodak Picture CD™ disk. The user selection software allows the user to display high resolution digital images and make use of these images to select print and service options. One feature of using high resolution digital images is that the user may zoom and crop the digital images while viewing the high resolution result of the zooming and cropping, Consequently, the user has a very good idea of what the images will actually look like upon fulfillment of his image service order 132. While this is currently possible by uploading images from Kodak Picture CD™ to an online photofinisher, this invention is distinguished by making these image file uploads unnecessary.

Within the specified amount of time, the user can select at least one image and at least one image service that may include printing at standard or custom sizes, specifying zooms, crops, special effects, Picture Pages, organizing and archiving image files, etc. without uploading images. In a simple form, the user need only specify at least one image for printing at a standard size. The photo finisher or a third party that created the CD 127 has stored the high resolution image files 112 corresponding to the images on the CD 127. The high resolution image files include digital images. The print server 135 may be equipped to receive and process digital images and or be networked to the user's memory device 127 via a telecommunications server 130. In one embodiment, the print server 135 requests a transfer of the high resolution digital image files 112 from the high resolution image storage device 110. When the user specifies prints and services, the images stored (for a limited time) at the photofinisher or third party are used to fulfill the image service order 132. The digital print server 135 at the photofinisher uses the high resolution digital image files 112 stored at the photofinisher's high resolution image storage device 110 to fulfill the image service order 132. Uploading image files is unnecessary and no image files are sent. However, the photofinisher or third party receives the image service order 132 from the user over a communication network 141. A data transmission device 140, such as a modem, with a baud rate as low as 9600 baud or lower will support the image service order 132 without difficulty. Therein, a remote photofinisher is automatically connected to the user's memory device via the communication network 141 that accesses the memory device.

Since the high resolution digital image files 112 are modified by the software at the user's discretion, the effects of the modifications can be viewed at high resolution. The advantage to the user is that modifications such as extreme zooms can be displayed in a manner that corresponds to the quality of future prints. Extreme zooms provide a user with information for assessing an output image product. Co-pending U.S. patent application Ser. No. 10/061,385, entitled, "SYSTEM AND METHOD OF PROCESSING A DIGITAL IMAGE FOR USER ASSESSMENT OF AN OUTPUT IMAGE PRODUCT," filed Feb. 1, 2002, by Fredlund et al. discloses the method and system for processing a digital image for user assessment of an output image product that uses the digital image. The system and method is suitable for images scanned from a film negative, images captured digitally, and images which may have been previously digitally manipulated. The system and method is suitable for an imaging device and a digital image capture device such as a digital camera. Additionally, one should note that particular output formats have an effect on image quality.

A specified valid ordering period may be selected by the photofinisher to best coincide with his business needs. There is no point in storing data intense high resolution images if the user does not order image-bearing products. Marketing incentives, such as a free print or additional services, may be offered to entice the user to review his images and order as soon as possible. Before the end of the specified valid ordering period, the photofinisher may send a prompt to the user such as a postcard or an email, if the user's address is known. The storage time may also be written to the CD 127 so that the user will be prompted by the software concerning the time the images will be available at the photofinisher. If the service has been sold with bundled prints, then the incentive to use the service promptly is provided by potential loss of the investment if prints are not selected in a timely fashion. The value of the output may be mixed and matched between a number of products, or the user can accrue credit for value not yet redeemed. Coupons may be issued for value not redeemed. Seasonal product offerings are facilitated. The time-dependent nature of the "easy-order" feature may drive a sense of urgency.

The software on the CD 127 can connect to the photofinisher's website, or can be used locally without such a connection. When the software is used without connection to the web, the order can be sent via email, or even by means of printed output sent through the postal service.

The website (or email) address for the photofinisher creating the CD 127 is written to the disk. When it is time to send the order, the software accesses the address on the CD 127 to contact the proper photofinisher. The software limits the user to contacting the particular photofinisher that wrote the high resolution digital image files 112 to the CD 127 and that has stored the corresponding image files.

The order number and image numbers are also written to the CD 127. The user need not key in cumbersome strings of numbers. The software accesses the order number so that there is never any error or confusion in ordering.

At the photofinisher, the consumer's images corresponding to the images on the CD are identified on the basis of the IDs stored with the image files. The IDs are used to ensure that the image services desired are fulfilled with the proper images.

The timing of the order process may be specified to minimize storage time of images at the photofinisher. At the end of the allotted time period, the photofinisher may take some action. For example, if the photofinisher has no order via the website or email corresponding to the identifier for the image files held in storage at the photofinisher that correspond to the image files on the CD, the order will be processed in accordance with information on the processing bag that delivered the film, or in some default manner such as a single print for each image.

Another alternative is to print an order form to be sent to the photofinisher. This eliminates any need for the user to have an internet or email connection to the photofinisher. An order form is printed at the user's location on the basis of the user's selections made via the software on the CD, and this order form is sent to the photofinisher via the mail or a retail photo-finishing bag. Preferably the order form is machine readable so that a simple scanning operation at the photofinisher can enter the order into the photofinisher's system such that the correct products and services are delivered.

The invention has been described with reference to a preferred embodiment; However, it will be appreciated that variations and modifications can be effected by a person of ordinary skill in the art without departing from the scope of the invention.

PARTS LIST 10 photographic studio
12 photo lab
14 subject
16 camera
18 developer
20 editor
22 analyzer
22a monitor
24 proof printer
26 final printer
28 database
30 diskette
32 studio computer
32a studio computer monitor
34 printer
34a video image display information box
100 photo selection services system
110 high resolution image storage device
112 high resolution digital image files
115 film processor
117 exposed film images
119 developed film
120 film scanner
125 memory device writer
127 memory device
128 consumer computer
130 telecommunications server
132 image service order
135 print server
137 image transfer request
140 data transmission device
141 communication network

What is claimed is:

1. A method for facilitating orders for image services, comprising the steps of:
    a) manually providing an image bearing medium having at least one high resolution image from a user to a photofinisher without transmitting any images over an electronic network;
    b) associating an identifier for the at least one high resolution image and storing the at least one high resolution image and the associated identifier on a photofinisher's image storage device;
    c) storing the at least one high resolution image and the associated identifier to a memory device;
    d) delivering the memory device to the user;
    e) selecting the at least one high resolution image for display and at least one image service with user selection software;
    f) creating at least one image service order using the user selection software;
    g) the photofinisher receiving the at least one image service order from the user over a communication network, wherein the user transmits the image service order, without any images, over the communication network,
    and h) fulfilling the at least one image service order using the at least one stored high resolution image in the photofinisher's image storage device to fulfill the at least one image service order.

2. The method claimed in claim 1, wherein an address of the photofinisher is stored on the memory device.

3. The method claimed in claim 1, wherein a valid order date is stored on the memory device.

4. The method claimed in claim 1, wherein order enticements are stored on the memory device.

5. The method claimed in claim 1, wherein the user makes a selection at a location remote from the photofinisher.

6. The method claimed in claim 1 further comprising the steps of:
    i) receiving, at a print server, the at least one image service order from a telecommunications server networked to the user's memory device; and
    j) transmitting the at least one high resolution digital image file from the photofinisher's image storage device to the print server.

7. The method claimed in claim 1, wherein the memory device is selected from the group consisting of: a CD, a DVD, a zip-disc, a memory card, a smart card, and a memory stick.

8. The method claimed in claim 1, further comprising the steps of:
    i) developing exposed film so as to develop at least one latent image on the film; and
    j) scanning the developed film so as to obtain at least one high resolution image of the at least one latent image on the exposed film.

9. A method for facilitating orders for image services, comprising the steps of:
    a) providing exposed film of a user to a photofinisher;
    b) developing the exposed film so as to develop at least one latent image on the film;
    c) scanning the developed film so as to obtain at least one high resolution digital image file of the at least one latent image on the exposed film;
    d) associating an identifier for the at least one high resolution digital image file and storing the at least one high resolution digital image file and the associated identifier on a photofinisher's image storage device;
    e) storing the at least one high resolution digital image file and the associated identifier to a memory device;
    f) delivering the memory device to the user;
    g) selecting the at least one high resolution digital image file for display and at least one image service with user selection software;
    h) creating at least one image service order using the user selection software;
    i) the photofinisher receiving the at least one image service order from the user over a communication network;
    j) fulfilling the at least one image service order using the at least one stored high resolution digital image file in the photofinisher's image storage device to fulfill the at least one image service order;
    k) receiving, at a print server, the at least one image service order from a telecommunications server networked to the user's memory device, wherein an address of the photofinisher and a valid order date are stored on the user's memory device; and
    l) transmitting the at least one high resolution digital image file from the photofinisher's image storage device to the print server.

10. A photo selection system for fulfilling an image service order, comprising:
   a) a photofinishing high resolution image storage device that stores high resolution digital image files subsequent to a manual delivery of the high resolution digital image files to a photofinisher;
   b) a memory device writer that stores, on a memory device, the high resolution digital image files for a consumer's subsequent use; and
   c) a telecommunications server that receives an image service order without any imaging file from the consumer and transmits the image service order to a print server, wherein the print server requests a transfer of the high resolution digital image files from the high resolution image storage device.

11. The photo selection system claimed in claim 10, wherein the telecommunications server receives the image service order from a data transmission device.

12. The photo selection system claimed in claim 10, wherein the memory device with the high resolution digital image files are given to the consumer for remote use.

13. The photo selection system claimed in claim 10, wherein the memory device includes selection software having a valid order period for creating the image service order.

14. The memory device claimed in claim 13, wherein the selection software includes an address of a photofinisher.

15. Memory device claimed in claim 13, wherein the selection software includes an image identifier that enables rapid identifying of corresponding high resolution digital image files stored at the photofinishing high resolution image storage device.

16. The memory device claimed in claim 13, wherein the selection software changes functionality upon a lapsed valid order period.

17. The memory device claimed in claim 13, wherein the selection software includes order enticements.

18. The memory device claimed in claim 13, wherein the means for obtaining the high resolution digital image files includes scanning developed film.

19. The memory device claimed in claim 13, wherein the means for obtaining the high resolution digital image files includes uploading digital images to a remote storage device.

20. The photo selection system claimed in claim 10, wherein the memory device is selected from the group consisting of: a CD, a DVD, a zip-disc, a memory card, a smart card, and a memory stick.

21. A method for facilitating orders for image services, comprising the step of:
   a) manually providing exposed film of a user to a photofinisher without transmitting any images over an electronic network;
   b) developing the exposed film so as to develop at least one latent image on the exposed film;
   c) scanning the developed film so as to obtain at least one high resolution digital image file of the at least one latent image on the exposed film;
   d) associating an identifier for the at least one high resolution digital image tile and storing the at least one high resolution digital image file and the associated identifier on a photofinisher's image storage device;
   e) storing the at least one high resolution digital image file and the associated identifier to a memory device;
   f) delivering the memory device to the user;
   g) selecting at least one image service and at least one high resolution digital image file for display by zooming and cropping the at least one high resolution digital image file with user selection software;
   h) creating an image service order using the user selection software;
   i) the photofinisher receiving the image service order from the user over a communication network, wherein the user transmits the image service order without any images over the communication network; and j) fulfilling the image service order using the at least one stored high resolution digital image tile in the photofinisher's image storage device to fulfill the image service order.

22. The method claimed in claim 21, wherein the user selection software includes an image identifier that enables rapid identifying of corresponding high resolution digital image files stored at the photofinisher.

23. The method claimed in claim 21, wherein an address of the photofinisher is stored on the memory device.

24. The method claimed in claim 21, wherein a valid order date is stored on the memory device.

25. The method claimed in claim 21, wherein order enticements are stored on the memory device.

26. The method claimed in claim 21, wherein the user makes a selection at a location remote from the photofinisher.

27. A method for facilitating orders for image services, comprising the steps of:
   a) manually providing an image bearing medium having at least one high resolution image from a user to a photofinisher without transmitting any images over an electronic network;
   b) associating an identifier for the at least one high resolution image and storing the at least one high resolution image and the associated identifier on a photofinisher's image storage device;
   c) storing the at least one high resolution image and the associated identifier to a memory device;
   d) delivering the memory device to the user;
   e) selecting the at least one high resolution image for display and at least one image service with user selection software;
   f) creating at least one image service order using the user selection software;
   g) the photofinisher receiving the at least one image service order from the user over a communication network, wherein the user transmits the image service order, without any images whose resolution is useful for fulfilling the image service order, over the communication network; and
   h) fulfilling the at least one image service order using the at least one stored high resolution image in the photofinisher's image storage device to fulfill the at least one image service order.

* * * * *

UNITED STATES PATENT AND TRADEMARK OFFICE
CERTIFICATE OF CORRECTION

PATENT NO. : 7,167,272 B2
APPLICATION NO. : 10/116998
DATED : January 23, 2007
INVENTOR(S) : John R. Fredlund et al.

It is certified that error appears in the above-identified patent and that said Letters Patent is hereby corrected as shown below:

| | |
|---|---|
| Claim 1, column 7, line 67. | In Claim 1, delete "network," and insert -- network; -- therefor. |
| Claim 8, column 8, line 29. | In Claim 8, delete "j)" and insert -- ii) --, therefor. |
| Claim 12, column 9, line 21. | In Claim 12, delete "are" and insert -- is --, therefor. |
| Claim 15, column 9, line 28. | In Claim 15, delete "Memory" and insert -- The memory --, therefor. |
| Claim 21, column 9, line 50. | In Claim 21, delete "step" and insert -- steps --, therefor. |
| Claim 21, column 9, line 60. | In Claim 21, delete "tile" and insert -- file --, therefor. |
| Claim 21, column 10, line 15. | In Claim 21, delete "tile" and insert -- file --, therefor. |

Signed and Sealed this

Seventh Day of August, 2007

JON W. DUDAS
*Director of the United States Patent and Trademark Office*